Figure 1:
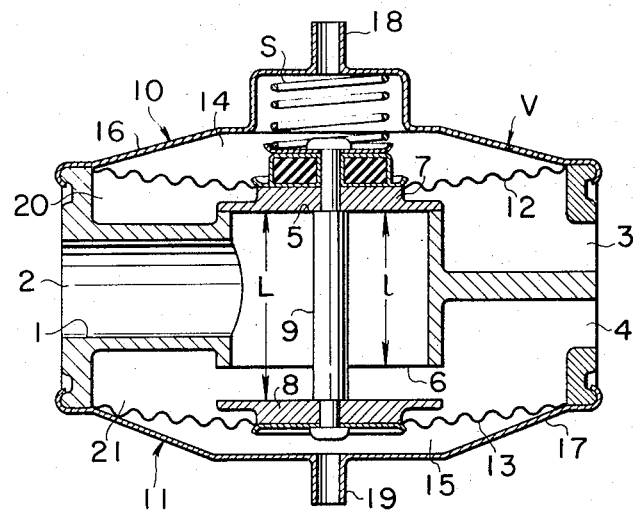

United States Patent [19]
Goto et al.

[11] 3,823,556
[45] July 16, 1974

[54] CHANGE-OVER VALVE ASSEMBLY FOR A GAS PASSAGEWAY

[75] Inventors: Kenji Goto; Kiyohiko Mizuno, both of Susono, Japan

[73] Assignee: Toyota Jidosha Kogyo Kabushiki Kaisha, Toyota, Aichi-ken, Japan

[22] Filed: Aug. 2, 1973

[21] Appl. No.: 385,043

Related U.S. Application Data
[63] Continuation of Ser. No. 253,268, May 15, 1972, abandoned.

[30] Foreign Application Priority Data
May 19, 1971    Japan.............................. 46-40429

[52] U.S. Cl................. 60/288, 23/288 F, 137/118, 137/625.5, 251/61.1
[51] Int. Cl........................... F01n 3/14, F02b 75/10
[58] Field of Search ...... 137/101, 118, 119, 625.29, 137/625.37, 625.48, 625.5; 251/61.1–61.5; 235/201 ME; 60/288; 23/288 F

[56] References Cited
UNITED STATES PATENTS

| | | | |
|---|---|---|---|
| 1,172,833 | 2/1916 | Ricker | 137/625.5 |
| 2,459,527 | 1/1949 | Herbert | 251/61.1 |
| 2,875,784 | 3/1959 | Cole | 137/625.5 |
| 3,010,469 | 11/1961 | Leighton | 137/118 |
| 3,100,002 | 8/1963 | Moore | 251/61.1 |
| 3,297,400 | 1/1967 | Eastwood | 60/288 |
| 3,682,199 | 8/1972 | Bader | 137/625.48 |

FOREIGN PATENTS OR APPLICATIONS

| | | | |
|---|---|---|---|
| 1,216,496 | 11/1959 | France | 60/288 |

*Primary Examiner*—Douglas Hart
*Attorney, Agent, or Firm*—Stevens, Davis, Miller & Mosher

[57] ABSTRACT

This invention relates to a change-over valve assembly for a gas passageway.

Said valve assembly comprises a pair of openings formed in a valve casing in positions symmetrical with each other for selectively causing a gas inlet duct to communicate with one of two gas outlet ducts, a plurality of valve bodies firmly secured to opposite ends of a stem so that each may open and close one of said pair of openings, two diaphragm means disposed near opposite sides of the valve casing in positions symmetrical with each other and each comprising a diaphragm and having one of said valve bodies firmly secured to a middle portion of the respective diaphragm, a two-way valve adapted to cause two diaphragm chambers of said two diaphragm means to communicate with a negative pressure source and a positive pressure source respectively, and a plurality of enlarged gas passage portions each formed between one of said pair of openings and the diaphragm of each said diaphragm means.

Said plurality of valve bodies are spaced apart from each other a distance greater than the distance between said pair of openings.

Said two diaphragm chambers each is defined by an outer cover of the valve casing and the respective diaphragm.

3 Claims, 2 Drawing Figures

CHANGE-OVER VALVE ASSEMBLY FOR A GAS PASSAGEWAY

This is a continuation of application Ser. No. 253,268, filed May 15, 1972 now abandon.

This invention relates to a change-over valve assembly provided in a gas passageway and adapted automatically to switch the direction of movement of a stream of gases between two outlet passageways. More particularly, it is concerned with a change-over valve assembly adapted to be mounted in a passageway for the exhausts of an internal combustion engine automatically to switch the direction of movement of the exhausts between one outlet passage in which an exhaust emission control device is mounted and the other outlet passageway in which no such device is mounted.

Some disadvantages are associated with change-over valve assemblies of the prior art adapted to be mounted in passageways for gases which are high in temperature and highly corrosive and which contain minute particles of materials tending to adhere to the passageways. Some of them are liable to succumb to the corroding influences of the gases and have a short service life while others tend to develop failures and misoperate.

In recent years, proposals have been made to use various exhaust emission control devices with motor vehicle engines in order to render the exhausts of such engines harmless by removing carbon monoxide, unburned hydrocarbons, oxides of nitrogen and other noxious components of the exhausts by subjecting them to oxidation or reduction. When any one of such devices is used, it is necessary that exhausts be vented to atmosphere without passing them through the exhaust emission control device when the amounts of noxious components of the exhausts are small and that they be passed through such device before being vented to atmosphere when such amounts are great, in order to maintain the operation of the internal combustion engine and the exhaust gas emission control device at a satisfoctory level. Thus, it is required to mount a change-over valve in the passageway for such exhausts.

Exhausts of internal combustion engines are high in temperature and highly corrosive and contain minute particles of lead compounds and other materials tending to adhere to the passageway. Change-over valves mounted in such passageway for exhausts are liable to develop seizure of sliding parts of the valve mechanism or corrosion of minute structure portions of the linkage. No change-over valves which can withstand such harmful influences have ever been developed.

Accordingly, an object of this invention is to provide a change-over valve assembly, adapted for mounting in a passageway for gases of the nature described and simple in construction, which can positively operate over a prolonged period of time and damp the pulsation and noise of a stream of gases introduced into the passageway.

Another object of the invention is to provide a change-over valve assembly adapted for use in a passageway for the exhausts of an internal combustion engine, simple in construction and compact in size, which can automatically switch the direction of movement of the exhausts between one outlet passageway in which an exhaust emission control device is mounted and the other outlet passageway in which no such device is mounted, and which can perform the operation satisfactorily.

Figure 2:
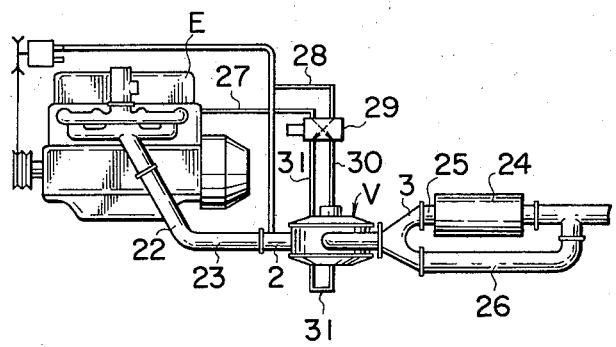

Additional and other objects as well as features and advantages of the invention will become evident from the description set forth hereinafter when considered in conjunction with the accompanying drawing, in which:

FIG. 1 is a vertical sectional view of the change-over valve assembly comprising one embodiment of this invention; and FIG. 2 is a schematic side view of an internal combustion engine in which the change-over valve assembly according to this invention is incorporated.

A change-over valve assembly V illustrated in FIG. 1 in a vertical sectional view comprises openings 5 and 6 formed in a valve casing 1 disposed symmetrically with each other for causing a gas inlet duct 2 to communicate with either a gas outlet port 3 or a gas outlet port 4. The valve assembly also comprises valve bodies 7 and 8 attached on one surface thereof to opposite ends of a stem 9 extending through valve casing 1 alternately to open and close openings 5 and 6.

Two valve bodies 7 and 8 are spaced apart from each other a distance L which is greater than the distance $l$ between two openings 5 and 6.

Diaphragm means 10 and 11 comprising diaphargms 12 and 13 made of flexible metal are disposed outwardly of openings 5 and 6 respectively in positions symmetrical with each other. The valve bodies 7 and 8 attached to the opposite ends of stem 9 as aforementioned are firmly secured on the other surface thereof to middle portions of diaphragms 12 and 13 respectively.

Outer covers 16 and 17 which cooperate with diaphragms 12 and 13 to form diaphragm chambers 14 and 15 respectively are firmly secured to an outer periphery of valve casing 1. Diaphragm chambers 14 and 15 are formed with communication ports 18 and 19 respectively for connecting the respective diaphragms chambers to a negative pressure source and positive pressure source as subsequently to be described.

On the other hand, enlarged passage portions 20 and 21 for enlarging the gas passageway are formed between diaphragms 12 and 13 and an outer surface of valve casing 1 and immediately downstream of openings 5 and 6 respectively.

A spring S is mounted between the middle portion of diaphragm 12 and outer cover 16 in upper diaphragm chamber 14 normally to urge by its biasing force valve body 7 and diaphragm 12 to move into a position in which valve body 7 is seated against opening 5.

The biasing force of spring S determines the level of negative pressure which actuates diaphragm means 10 and 11.

FIG. 2 shows the change-over valve assembly V of FIG. 1 as incorporated in the exhaust system of an internal combustion engine E. An exhaust line 22 connected at one end to an exhaust manifold is connected at a downstream end portion 23 thereof to the gas inlet duct 2 of change-over valve assembly V whose gas outlet duct 3 is connected to an exhaust passageway 25 provided therein with an exhaust emission control device 24 and whose gas outlet duct 4 is connected to the other exhaust passageway 26 having no such device mounted therein.

A line 27 is connected at one end thereof to engine E to draw out therethrough from the engine a negative pressure while another line 28 is connected to engine E to draw out from the engine a pneumatic pressure for a pump for delivering secondary air under pressure to exhaust emission control device 24. Lines 27 and 28 are each connected at the other end thereof to a port at one side of a two-way valve 29 while lines 30 and 31 are each connected at one end thereof to a port on the other side of two-way valve 29, the lines 30 and 31 being connected at the other end thereof to the communication ports 18 and 19 of diaphragm chamber 14 and 15 respectively.

Two-way valve 29 is adapted to be automatically controlled so as to be actuated and de-actuated depending on the temperature of cooling water, vehicle speed and other conditions of output power after the engine E is started. On the other hand, diaphragms 12 and 13 are set at a predetermined level of force for actuating them such that when a negative pressure of the predetermined level is introduced into diaphragm chamber 14 and a secondary air pressure is introduced into diaphragm chamber 15, diaphragms 12 and 13 are actuated to move valve body 7 away from its seat juxtaposed to opening 5 and valve body 8 into a seat juxtaposed to opening 6 to close the same against the biasing force of spring S. Accordingly, when the negative pressure is reduced in level below the level of force for actuating diaphragms 12 and 13, valve bodies 7 and 8 are restored to their positions shown in FIG. 1.

Assuming that engine E is started and in a lower to intermediate revolution range in which exhausts from the engine contain large amounts of noxious components, two-way valve 29 will be actuated such that a negative pressure is introduced from the engine through lines 27 and 30 to diaphragm chamber 14 while a secondary air pressure is introduced from the engine through lines 28 and 31 to diaphragm chamber 15. When the force exerted on each diaphragm or the force directed upwardly in FIG. 1 exceeds the aforementioned predetermined level for actuating the same, diaphragms 12 and 13 move upwardly in FIG. 1 against the biasing force of spring S, thereby moving valve bodies 7 and 8 upwardly to open opening 5 and close opening 6. Thus, a stream of exhausts containing large amounts of noxious components is introduced into exhaust passageway 25 and the noxious components are removed by device 24.

If the level of the negative pressure is reduced below the level set for actuation of the diaphragms or the engine operation is in a high speed revolution range in which exhausts from the engine contain relatively small amounts of noxious elements, two-way valve 29 will automatically switch the negative pressure and the positive pressure between the two paths of movements so that the negative pressure will be supplied to diaphragm chamber 15 and the positive pressure to diaphragm chamber 14. Thus, the valve bodies 7 and 8 are moved downwardly in FIG. 1 by the biasing force of spring S so as to open opening 6 and close opening 5, thereby permitting a stream of exhausts to move through exhaust passageway 26 and vented to atmosphere.

No matter which exhaust passageway the stream of exhausts moves through, the stream of exhausts that has passed through opening 5 or 6 has its pulsations attenuated by the presence of enlarged passage portion 20 or 21 disposed near the periphery of each opening and formed in part by diaphragms 12 or 13 made of flexible metal. The presence of enlarged passage portions 20 and 21 is also effective to muffle the noises of exhausts to a certain extent.

From the foregoing description, it will be appreciated that the change-over valve assembly according to this invention includes no sliding parts and is simple in construction. This permits the change-over valve assembly to operate positively over a prolonged period of time without suffering damage when mounted in a passageway for gases which are high in temperature and highly corrosive and which contain minute particles of lead compounds and other materials which tend to adhere to the gas passageway. The valve is dependable in operation and efficient in operation.

The provision in the valve casing of enlarged gas passage portions whose wall surfaces are formed in part by diaphragms made of flexible metal is effective to attenuate pulsations of a stream of exhausts introduced into the valve assembly and muffle noises of such exhausts, thereby preventing spread of pulsations of the stream of exhausts to the downstream side of the exhaust passageway.

The valve bodies of the change-over valve assembly according to this invention can be operated by the negative pressure of the internal combustion engine and the positive pressure of air supplied to the exhaust emission control device as secondary air as well as the resilience of the component parts of the valve assembly. Thus, the valve assembly requires no additional power source for operation, in addition to being compact in size and light in weight.

What we claim is:

1. A change-over valve assembly for an exhaust passageway mounted in an exhaust passageway from an exhaust manifold of an internal combustion engine in a position which corresponds to the junction of two exhaust passageways connected to the downstream end of said first mentioned exhaust passageway and adapted to switch the direction of movement of a stream of exhausts moving through said first mentioned exhaust passageway between said last mentioned two exhaust passageways, one of said two exhaust passageways containing exhaust gas purifying means and the other of said two exhaust passageways communicating directly to the atmosphere, said change-over valve assembly comprising an inlet duct connected at one end thereof to the downstream end of said first mentioned exhaust passageway and formed at the other end thereof with a pair of openings which are parallel and disposed opposite to each other, a valve element comprising two plate valve bodies connected to each other for movement as a unit and spaced apart from each other a distance greater than the distance between said pair of openings, said plate valve bodies being disposed parallel to said pair of openings and adapted to alternately close the same, a plurality of diaphragm chambers each comprising a diaphragm made of a heat resisting material, said diaphragms of said plurality of diaphragm chambers being connected to said valve element, a pair of outlet ports connecting said pair of openings to a respective one of said two exhaust passageways, and control means responsive to a negative pressure developed at the internal combustion engine to regulate the position of said valve element to selectively place said first mentioned exhaust passageway into communication with a predetermined one of said two exhaust passageways via said outlet ports.

2. Apparatus according to claim 1, wherein said control means are also responsive to a positive pressure developed during running of the engine.

3. Apparatus according to claim 2, wherein said control means include control valve means and tubing for selectively and alternately supplying the negative pressure to one of said diaphragm chambers and the positive pressure to the other of said diaphragm chambers in order to regulate the position of said valve element.

* * * * *